(12) United States Patent
Shaffer et al.

(10) Patent No.: US 9,739,392 B2
(45) Date of Patent: Aug. 22, 2017

(54) DAMPER VALVE AND A HEAT PUMP WATER HEATER APPLIANCE

(71) Applicant: General Electric Company, Schenectady, NY (US)

(72) Inventors: Timothy Scott Shaffer, La Grange, KY (US); Shaun Michael Ward, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 258 days.

(21) Appl. No.: 14/508,238

(22) Filed: Oct. 7, 2014

(65) Prior Publication Data
US 2016/0097573 A1    Apr. 7, 2016

(51) Int. Cl.
| | | |
|---|---|---|
| *F25B 41/04* | (2006.01) | |
| *F16K 27/04* | (2006.01) | |
| *F16K 31/60* | (2006.01) | |
| *F25B 30/00* | (2006.01) | |
| *F16K 11/072* | (2006.01) | |
| *F24F 5/00* | (2006.01) | |
| *F24H 4/02* | (2006.01) | |

(52) U.S. Cl.
CPC ............ *F16K 27/04* (2013.01); *F16K 11/072* (2013.01); *F16K 31/602* (2013.01); *F24F 5/0096* (2013.01); *F24D 2200/12* (2013.01); *F24H 4/02* (2013.01); *Y02B 30/12* (2013.01)

(58) Field of Classification Search
CPC ...... F16K 27/04; F16K 11/072; F16K 31/602; F24F 5/0096; Y02B 30/12; F24D 2200/12; F24H 4/02

USPC .......... 62/238.7, 324.6; 137/625.19, 625.31; 165/7, 240; 237/2 B, 19
See application file for complete search history.

(56) References Cited

U.S. PATENT DOCUMENTS

| | | | | |
|---|---|---|---|---|
| 607,669 | A * | 7/1898 | Underwood | F23L 11/02 |
| | | | | 126/293 |
| 2,015,641 | A * | 9/1935 | Colbie | F24H 1/102 |
| | | | | 219/523 |
| 2,328,439 | A * | 8/1943 | Esnault-Pelterie | F02B 75/22 |
| | | | | 417/271 |
| 2,396,252 | A * | 3/1946 | Cross | F24H 1/26 |
| | | | | 122/158 |
| 2,556,583 | A * | 6/1951 | Hinz | F16K 3/085 |
| | | | | 251/340 |

(Continued)

FOREIGN PATENT DOCUMENTS

| | | |
|---|---|---|
| CN | 2896123 Y | 5/2007 |
| CN | 203068792 U | 7/2013 |
| GB | 2116301 A * | 9/1983 .......... F24D 11/0235 |

*Primary Examiner* — Len Tran
*Assistant Examiner* — Kirstin Oswald
(74) *Attorney, Agent, or Firm* — Dority & Manning, P.A.

(57) ABSTRACT

The present subject matter provides a damper valve. The damper valve includes an outer sleeve and an inner sleeve. The inner sleeve is positioned within the outer sleeve and is pivotable between a first position and a second position within the outer sleeve. Radial openings of the inner sleeve align with radial openings of the outer sleeve when the inner sleeve is in the first position, and axial openings of the inner sleeve align with axial openings of the outer sleeve when the inner sleeve is in the second position. A related heat pump water heater appliance is also provided.

6 Claims, 9 Drawing Sheets

(56) References Cited

U.S. PATENT DOCUMENTS

| | | | | | |
|---|---|---|---|---|---|
| 3,077,926 | A | * | 2/1963 | Fikenscher | F23L 15/02 165/140 |
| 3,079,981 | A | * | 3/1963 | Loebel | F23D 11/00 431/263 |
| 3,426,797 | A | * | 2/1969 | Baker | F16K 3/085 137/625.31 |
| 3,753,469 | A | * | 8/1973 | Tuttle | B24B 23/026 173/1 |
| 4,290,275 | A | * | 9/1981 | Disco | F24H 4/04 122/4 R |
| 4,516,606 | A | * | 5/1985 | Worley | F15D 1/0005 137/625.3 |
| 4,803,931 | A | * | 2/1989 | Carson | F23L 13/04 110/163 |
| 5,134,860 | A | * | 8/1992 | Drucker | F25B 41/06 137/513.3 |
| 5,924,299 | A | * | 7/1999 | Karl | B60H 1/00485 62/225 |
| 6,076,365 | A | * | 6/2000 | Benatav | F16K 11/0743 137/625.43 |
| 7,334,419 | B2 | * | 2/2008 | Gordon | F24H 4/04 62/238.7 |
| 2008/0296396 | A1 | * | 12/2008 | Corroy | F25B 6/02 237/2 B |
| 2012/0023990 | A1 | * | 2/2012 | Nelson | F24H 4/04 62/238.7 |

\* cited by examiner

DAMPER VALVE AND A HEAT PUMP WATER HEATER APPLIANCE

FIELD OF THE INVENTION

The present subject matter relates to damper valves, such as damper valves for heat pump water heater appliances.

BACKGROUND OF THE INVENTION

Water heaters generally operate to heat water within the water heater appliance's tank to a set temperature. Heat pump water heaters are gaining broader acceptance as a more economic and ecologically-friendly alternative to electric and gas water heaters. Heat pump water heaters include a sealed system for heating water to the set temperature. Sealed systems generally heat water more efficiently than electric heating elements and gas burners.

During operation, sealed systems can transfer heat from air about the heat pump water heater to water within the tank. Depending upon the location of the heat pump water heater and seasonal conditions, such heat transfer can be desirable or undesirable. For example, a user of the heat pump water heater may save money on air conditioning during summer months when the heat pump water heater is installed within or adjacent a living space and the heat pump water heater cools air around the heat pump water heater during operation. Conversely, the cooled air from the water heater appliance may be less convenient during winter months. Positioning the heat pump water heater within a garage or other non-living space may alleviate the cooled air problems during winter months. However, such positioning also eliminates the benefit of the cooled air during summer months.

Accordingly, a heat pump water heater appliance with features for regulating chilled air from the heat pump water heater appliance would be useful. In particular, a heat pump water heater appliance with features for directing chilled air away from living areas during winter months and to living areas during summer months would be useful.

BRIEF DESCRIPTION OF THE INVENTION

The present subject matter provides a damper valve. The damper valve includes an outer sleeve and an inner sleeve. The inner sleeve is positioned within the outer sleeve and is pivotable between a first position and a second position within the outer sleeve. Radial openings of the inner sleeve align with radial openings of the outer sleeve when the inner sleeve is in the first position, and axial openings of the inner sleeve align with axial openings of the outer sleeve when the inner sleeve is in the second position. A related heat pump water heater appliance is also provided. Additional aspects and advantages of the invention will be set forth in part in the following description, or may be apparent from the description, or may be learned through practice of the invention.

In a first exemplary embodiment, a heat pump water heater appliance is provided. The heat pump water heater appliance includes a casing and a tank positioned within the casing. The tank defines an interior volume. A sealed system is configured for heating water within the interior volume of the tank. The sealed system has an evaporator positioned within the casing. An intake duct extends to the casing and is configured for directing a flow of air towards the evaporator within the casing. An exhaust duct extends from the casing and is configured for directing the flow of air out of the casing. A damper valve is coupled to the intake duct or the exhaust duct. The damper valve includes an outer sleeve that defines an inner volume for receiving the flow of air. The outer sleeve defines a plurality of radial openings. The outer sleeve has a flow plate positioned within the inner volume of the outer sleeve. The flow plate of the outer sleeve defines a plurality of axial openings. An inner sleeve is pivotally mounted within the outer sleeve. The inner sleeve is pivotable between a first position and a second position. The inner sleeve defines a plurality of radial openings. The plurality of radial openings of the inner sleeve is aligned with the plurality of radial openings of the outer sleeve when the inner sleeve is in the first position. The inner sleeve has a flow plate positioned within the inner volume of the outer sleeve. The flow plate of the inner sleeve defines a plurality of axial openings. The plurality of axial openings of the inner sleeve is aligned with the plurality of axial openings of the outer sleeve when the inner sleeve is in the second position.

In a second exemplary embodiment, a damper valve is provided. The damper valve defines an axial direction, a radial direction, and a circumferential direction. The damper valve includes an outer sleeve that defines an inner volume for receiving a flow of air. The outer sleeve defines a plurality of radial openings that extend though the outer sleeve along the radial direction. The outer sleeve has a flow plate positioned within the inner volume of the outer sleeve. The flow plate of the outer sleeve defines a plurality of axial openings that extend through the flow plate of the outer sleeve along the axial direction. An inner sleeve is positioned within the outer sleeve. The inner sleeve is pivotable between a first position and a second position within the outer sleeve. The inner sleeve defines a plurality of radial openings that extend through the inner sleeve along the radial direction. Each radial opening of the plurality of radial openings of the inner sleeve is aligned with a respective one of the plurality of radial openings of the outer sleeve when the inner sleeve is in the first position. The inner sleeve has a flow plate positioned within the inner volume of the outer sleeve. The flow plate of the inner sleeve defines a plurality of axial openings that extend through the flow plate of the inner sleeve along the axial direction. Each axial opening of the plurality of axial openings of the inner sleeve is aligned with a respective one of the plurality of axial openings of the outer sleeve when the inner sleeve is in the second position.

In a third exemplary embodiment, a heat pump water heater appliance is provided. The heat pump water heater appliance includes a casing and a tank positioned within the casing. The tank defines an interior volume. A sealed system is configured for heating water within the interior volume of the tank. The sealed system has an evaporator positioned within the casing. An intake duct extends to the casing and is configured for directing a flow of air towards the evaporator within the casing. An exhaust duct extends from the casing and is configured for directing the flow of air out of the casing. The heat pump water heater appliance also includes means for regulating the flow of air through the intake duct or the exhaust duct.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
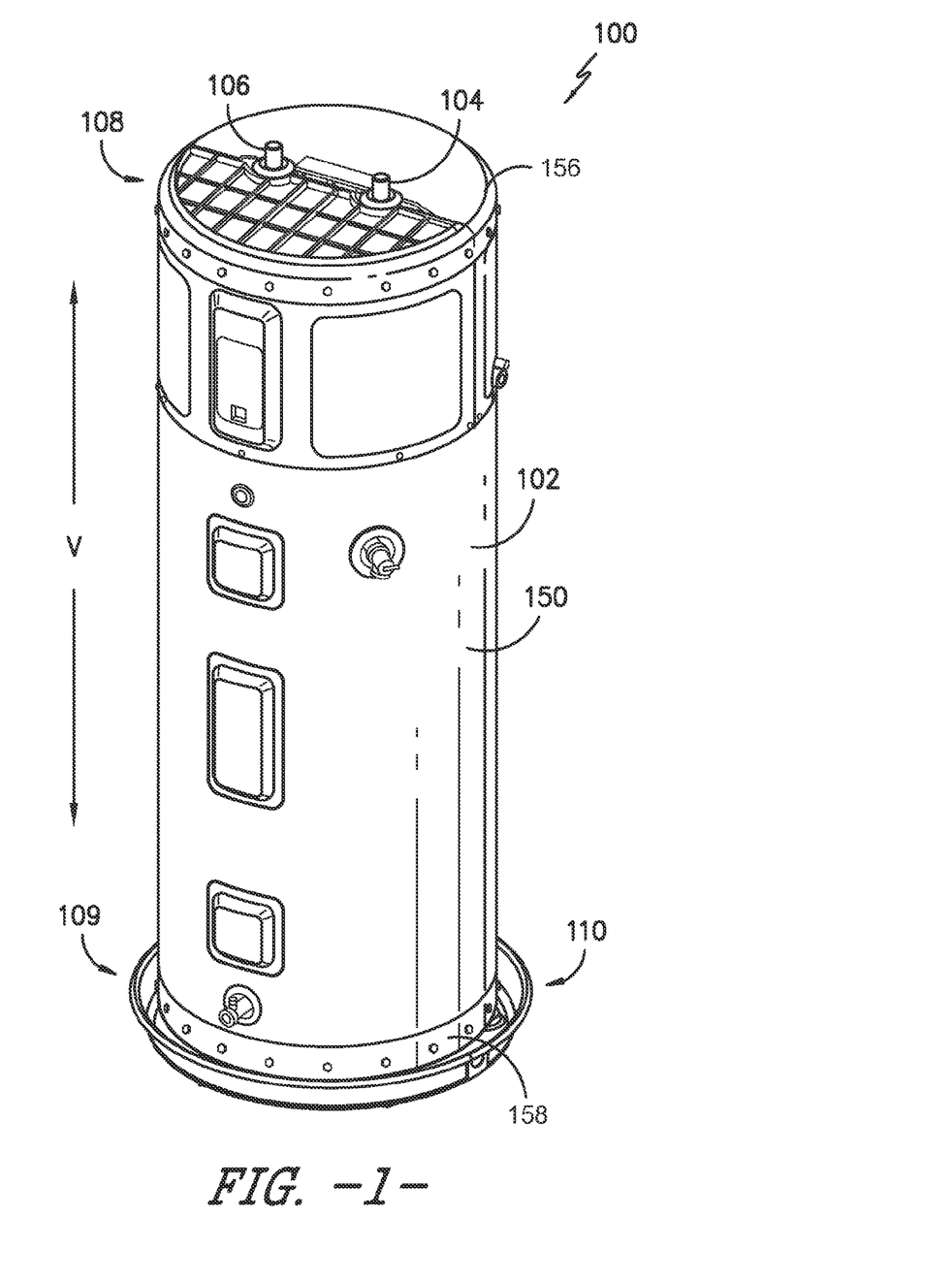
FIG. 1 provides a perspective view of a water heater appliance according to an exemplary embodiment of the present subject matter.

FIG. 1 provides a perspective view of a water heater appliance 100 according to an exemplary embodiment of the present subject matter. Water heater appliance 100 includes an outer shell or casing 102. Casing 102 generally surrounds a tank 112 (FIG. 2) such that tank 112 is disposed within casing 102. Casing 102 may be formed from a variety of components. As illustrated, casing 102 may include a wrapper 154 and one or more covers, such as a top cover 156 and a bottom cover 158 as illustrated. Covers 156, 158 may be fastened or coupled to wrapper 154 to form casing 102.

Upper and lower heating elements 118, 119 (FIG. 2) and a sealed system 120 (FIG. 2) may also be positioned within casing 102 for heating water within tank 112. Upper and lower heating elements 118, 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes an inlet or cold water conduit 104 and an outlet or hot water conduit 106 that are both in fluid communication with a chamber or interior volume 114 (FIG. 2) defined by tank 112. As an example, cold water from a water source, e.g., a municipal water supply or a well, can enter water heater appliance 100 through cold water conduit 104. From cold water conduit 104, such cold water can enter interior volume 114 of tank 112 wherein it is heated with heating elements 118, 119 and/or sealed system 120 to generate heated water. Such heated water can exit water heater appliance 100 at hot water conduit 106 and, e.g., be supplied to a bath, shower, sink, or any other suitable feature.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 (FIG. 2) of water heater appliance 100. It should be understood that water heater appliance 100 is provided by way of example only and that the present subject matter may be used with any suitable water heater appliance, including for example a heat pump water heater appliance.

Figure 2:
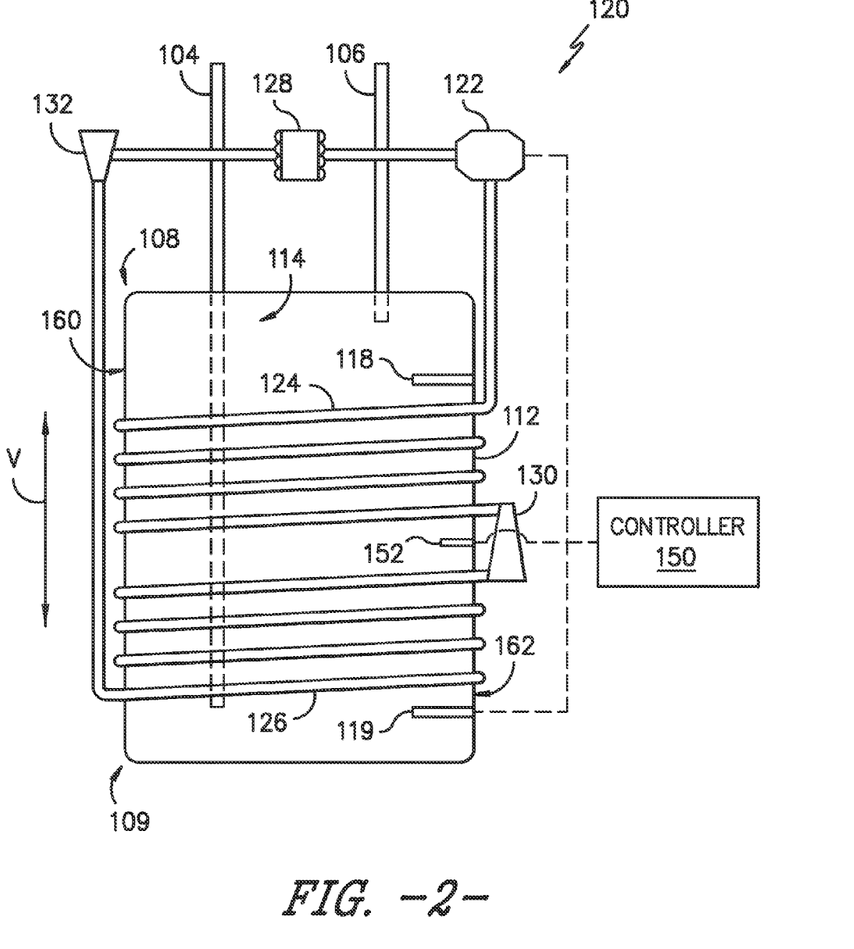
FIG. 2 provides a schematic view of certain components of the exemplary water heater appliance of FIG. 1.

FIG. 2 provides a schematic view of certain components of water heater appliance 100. As may be seen in FIG. 2, water heater appliance 100 may include sealed system 120 for heating water within interior volume 114 of tank 112. Sealed system 120 generally operates in a heat pump cycle. Thus, water heater appliance 100 is commonly referred to as a "heat pump water heater appliance." Water heater appliance 100 may additionally include one or more auxiliary heating elements, such as upper heating element 118 and/or lower heating element 119.

Sealed system 120 may include a compressor 122, a first condenser 124, a second condenser 126 and an evaporator 128. Compressor 122 and/or evaporator 128 of sealed system 120 may be disposed within casing 102 at top portion 108 of water heater appliance 100. As is generally understood, various conduits may be utilized to flow refrigerant between the various components of sealed system 120. Thus, e.g., evaporator 128 may be between and in fluid communication with second condenser 126 and compressor 122. During operation of sealed system 120, refrigerant may flow from evaporator 128 through compressor 122. For example, refrigerant may exit evaporator 128 as a fluid in the form of a superheated vapor and/or high quality vapor mixture. Upon exiting evaporator 128, the refrigerant may enter compressor 122. Compressor 122 may be operable to compress the refrigerant. Accordingly, the pressure and temperature of the refrigerant may be increased in compressor 122 such that the refrigerant becomes a superheated vapor.

Each condenser 124, 126 may be assembled in a heat exchange relationship with tank 112 in order to heat water within interior volume 114 of tank 112 during operation of sealed system 120. First condenser 124 may be positioned downstream of and in fluid communication with compressor 122, and may be operable to heat the water within interior volume 114 using energy from the refrigerant. For example, the superheated vapor from compressor 122 may enter first condenser 124 wherein it transfers energy to the water within tank 112 and condenses into a saturated liquid and/or liquid vapor mixture. Second condenser 126 may be positioned downstream of and in fluid communication with first condenser 124, and may additionally be operable to heat the water within interior volume 114 using energy from the refrigerant, such as by further condensing the refrigerant.

Sealed system 120 may also include a first throttling device 130 between first condenser 124 and second condenser 126, and/or a second throttling device 132 between second condenser 126 and evaporator 128. Refrigerant, which may be in the form saturated liquid vapor mixture, may exit first condenser 124 and travel through first throttling device 130 before flowing through second condenser 126. First throttling device 130 may generally expand the refrigerant, lowering the pressure and temperature thereof. The refrigerant may then be flowed through second condenser 126. Similarly, refrigerant, which may be in the form of high quality/saturated liquid vapor mixture, may exit second condenser 126 and travel through second throttling device 132 before flowing through evaporator 128. Second throttling device 132 may generally expand the refrigerant, lowering the pressure and temperature thereof. The refrigerant may then be flowed through evaporator 128.

First and second throttling devices 130, 132 may be any suitable components for generally expanding the refrigerant. For example, in some exemplary embodiments, first and second throttling device 130, 132 may be a Joule-Thomson expansion valve, also known as a "J-T valve." In other exemplary embodiments, first and second throttling device 130, 132 may be an ejector. In still other exemplary embodiments, a capillary tube, fixed orifice, or other suitable apparatus may be utilized as first and second throttling device 130, 132.

Water heater appliance 100 may additionally include a temperature sensor 152. Temperature sensor 152 may be configured for measuring a temperature of water within interior volume 114 of tank 112. Temperature sensor 152 can be positioned at any suitable location within water heater appliance 100. For example, temperature sensor 152 may be positioned within interior volume 114 of tank 112 or may be mounted to tank 112 outside of interior volume 114 of tank 112. Temperature sensor 152 may further be positioned within upper portion 160 or lower portion 162. When mounted to tank 112 outside of interior volume 114 of tank 112, temperature sensor 152 can be configured for indirectly measuring the temperature of water within interior volume 114 of tank 112. For example, temperature sensor 152 can measure the temperature of tank 112 and correlate the temperature of tank 112 to the temperature of water within interior volume 114 of tank 112. Temperature sensor 152 may be any suitable temperature sensor. For example, temperature sensor 152 may be a thermocouple or a thermistor.

Water heater appliance 100 may further include a controller 150 that regulates operation of water heater appliance 100. Controller 150 may be, for example, in operative communication with sealed system 120 (such as compressor 122, and/or other components thereof), auxiliary heating elements, and/or temperature sensor 152. Thus, controller 150 can selectively activate system 120 and/or auxiliary heating elements in order to heat water within interior volume 114 of tank 112.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 3:
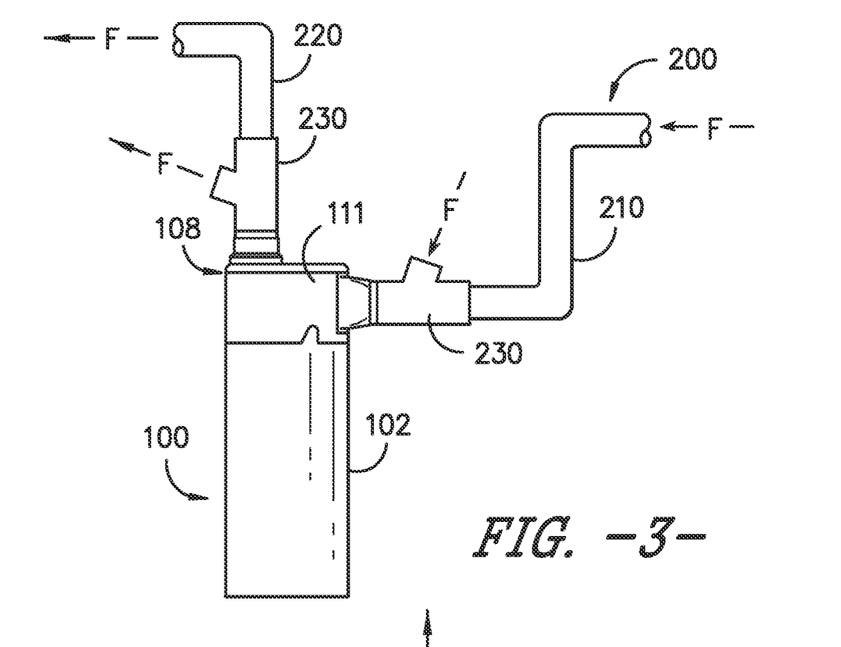
FIG. 3 provides a schematic view of the exemplary water heater appliance of FIG. 1 and a ventilation kit of the exemplary water heater appliance.

FIG. 3 provides a schematic view of water heater appliance 100 and a ventilation kit 200 of water heater appliance 100. Ventilation kit 200 includes features for selectively directing a flow of air F to water heater appliance 100 and for selectively directing the flow of air F away from water heater appliance 100. As may be seen in FIG. 3, ventilation kit 200 includes an intake duct 210, an exhaust duct 220 and damper valves 230. Intake duct 210 extends to casing 102, e.g., a shroud 111 of casing 102 at top portion 108 of water heater appliance 100. Thus, an end of intake duct 210 may be mounted to casing 102 at top portion 108 of water heater appliance 100, as shown in FIG. 3. An opposite end of intake duct 210 may be positioned at any suitable location. For example, the opposite end of intake duct 210 may be positioned at a garage or crawlspace of a building housing water heater appliance 100. Intake duct 210 is configured for directing the flow of air F through intake duct 210 into casing 102, e.g., towards evaporator 128 of sealed system 120 (FIG. 2) within casing 102. Thus, intake duct 210 may receive the flow of air F at a remote location, e.g., having a different ambient temperature than air about water heater appliance 100, and direct the flow of air F to water heater appliance 100.

Exhaust duct 220 extends from casing 102, e.g., shroud 111 of casing 102 at top portion 108 of water heater appliance 100. Thus, an end of exhaust duct 220 may be mounted to casing 102 at top portion 108 of water heater appliance 100, as shown in FIG. 3. An opposite end of exhaust duct 220 may be positioned at any suitable location. For example, the opposite end of exhaust duct 220 may be positioned at the garage or crawlspace of the building housing water heater appliance 100. Exhaust duct 220 is configured for directing the flow of air F through exhaust duct 220 away from casing 102. Thus, exhaust duct 220 may receive the flow of air F from water heater appliance 100 and direct the flow of air F to the remote location, e.g., having a different ambient temperature than air about water heater appliance 100.

Damper valves 230 regulate the flow of air F through ventilation kit 200. Each damper valve of damper valves 230 is mounted to or at a respective one of intake duct 210 and exhaust duct 220. Damper valves 230 are selectively adjustable between an open configuration and a closed configuration. In the open configuration, damper valves 230 do not hinder or prevent the flow of air F through intake duct 210 and exhaust duct 220. Thus, the flow of air F from the remote location may flow to water heater appliance 100 via intake duct 210 when the associated damper valve 230 is in the open configuration and the flow of air F from water heater appliance 100 may flow through the exhaust duct 220 to the remote location when the associated damper valve 230 is in the open configuration. Conversely, damper valves 230 hinder or prevent the flow of air F through intake duct 210 and exhaust duct 220 in the closed configuration. Thus, ambient air about water heater appliance 100 may be directed towards evaporator 128 of sealed system 120 within casing 102 via intake duct 210 when the associated damper valve 230 is in the closed configuration. In addition, the flow of air F may be directed into the ambient air about water heater appliance 100 via exhaust duct 220 when the associated damper valve 230 is in the closed configuration.

By selectively adjusting damper valves 230 between the open and closed configurations, the flow of air F may be regulated. For example, during cold months, the flow of air F may be directed the remote area rather than into the ambient air about water heater appliance 100 in order to avoid directing chilled air into the ambient air about water heater appliance 100. As another example, during summer months, the flow of air F may be directed into the ambient air about water heater appliance 100 rather the remote area rather than in order to direct chilled air into the ambient air about water heater appliance 100. In such a manner, a user of water heater appliance 100 may utilize ventilation kit 200 to regulate the flow of air F to and from water heater appliance 100.

Figure 4:
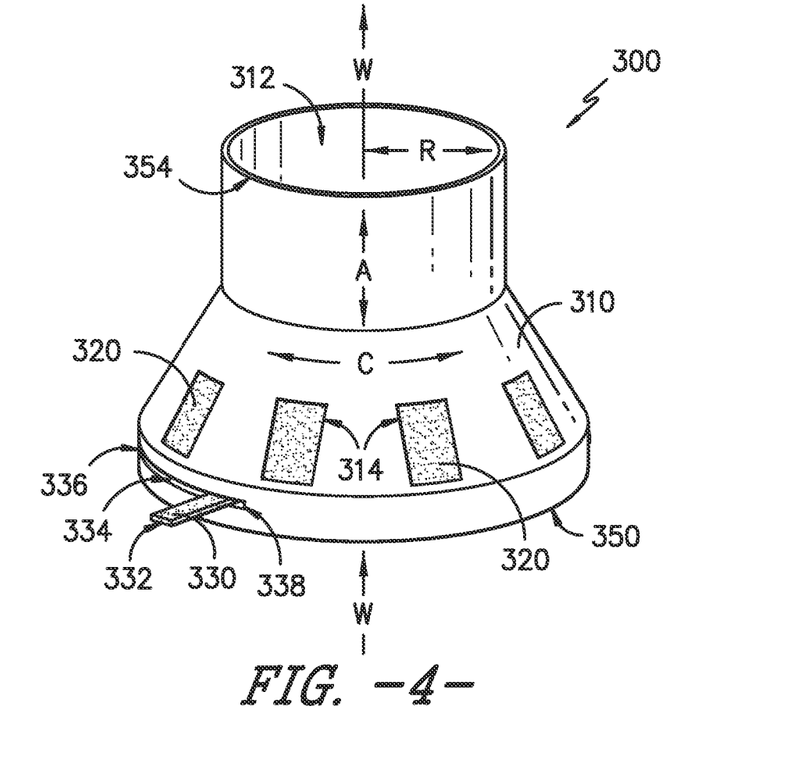
FIG. 4 provides a perspective view of a damper valve according to an exemplary embodiment of the present subject matter.
Figure 5:
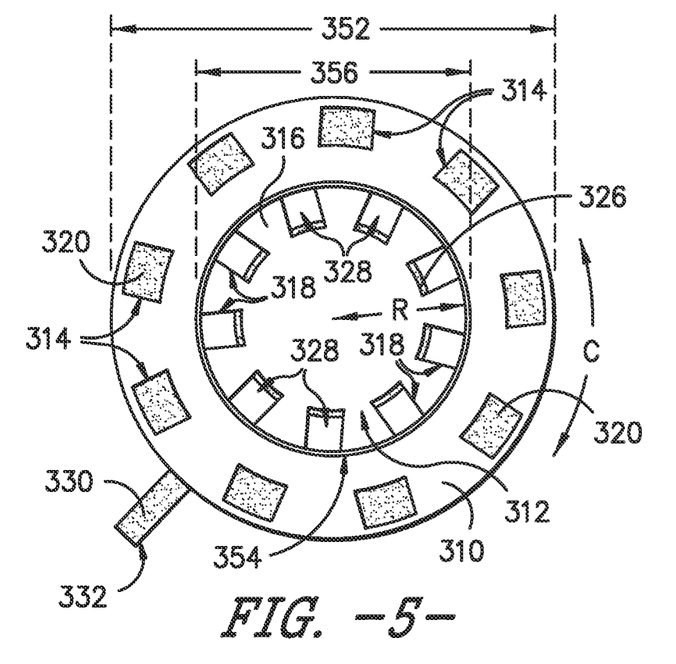
FIGS. 5 and 6 provide top, plan views of the exemplary damper valve of FIG. 4 with an inner sleeve of the exemplary damper valve shown in various positions.
Figure 6:
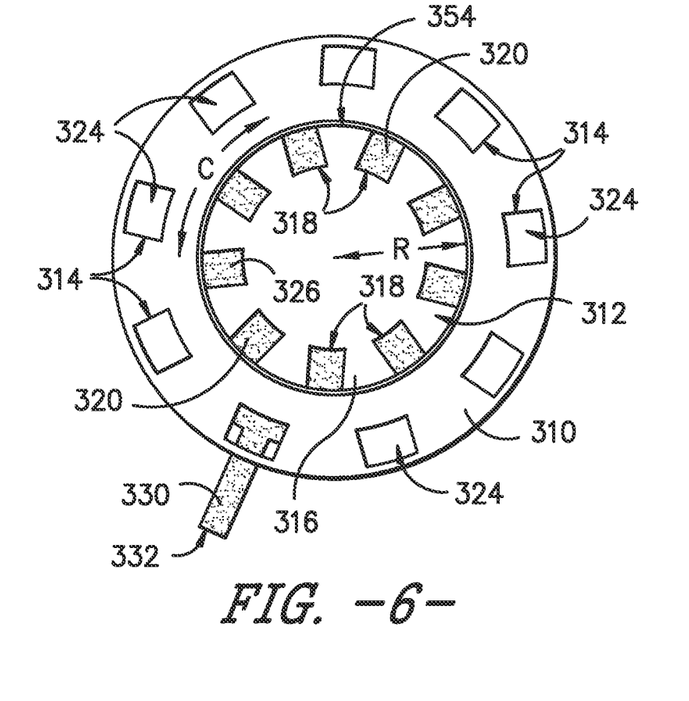

FIG. 4 provides a perspective view of a damper valve 300 according to an exemplary embodiment of the present subject matter. FIGS. 5 and 6 provide top, plan views of damper valve 300 with an inner sleeve 320 of damper valve 300 shown in various positions. Damper valve 300 may be used for any suitable purpose. For example, damper valve 300 may be used in ventilation kit 200 as one of damper valves 230 (FIG. 3). As discussed in greater detail below, damper valve 300 includes features for regulating a flow of air W through damper valve 300. As may be seen in FIG. 4, damper valve 300 defines an axial direction A, a radial direction R and a circumferential direction C.

Damper valve 300 includes an outer sleeve 310 and an inner sleeve 320. As may be seen in FIG. 4, outer sleeve 310 defines an inner volume 312. Inner volume 312 of outer sleeve 310 is configured for receiving the flow of air W and directing the flow of air W through outer sleeve 310. As may be seen in FIG. 5, outer sleeve 310 defines a circular entrance 350 and a circular exit 354. Circular entrance 350 is configured for directing the flow of air W into inner volume 312 of outer sleeve 310. Conversely, circular exit 354 is configured for directing the flow of air W out of inner volume 312 of outer sleeve 310. Circular entrance 350 has a diameter 352, and circular exit 354 also has a diameter 356. The diameter 352 of circular entrance 350 and the diameter 356 of circular exit 354 may be any suitable size. For example, the diameter 352 of circular entrance 350 may be greater than the diameter 356 of circular exit 354, as shown in FIGS. 4 and 5. In alternative exemplary embodiments, the diameter 352 of circular entrance 350 may be equal to or less than the diameter 356 of circular exit 354.

Outer sleeve 310 also defines a plurality of radial openings 314, e.g., that are spaced apart from each other or distributed along the circumferential direction C. Radial openings 314 of outer sleeve 310 extend though outer sleeve 310, e.g., along the radial direction R, to inner volume 312 of outer sleeve 310. Thus, radial openings 314 of outer sleeve 310 provide access or passage into or out of inner volume 312 of outer sleeve 310 through outer sleeve 310. Outer sleeve 310 also has a flow plate 316. Flow plate 316 of outer sleeve 310 is positioned within inner volume 312 of outer sleeve 310. Flow plate 316 of outer sleeve 310 defines a plurality of axial openings 318. Axial openings 318 of outer sleeve 310 extend through flow plate 316 of outer sleeve 310, e.g., along the axial direction A. Thus, axial openings 318 of outer sleeve 310 provide access or passage through flow plate 316 of outer sleeve 310 within inner volume 312 of outer sleeve 310.

Inner sleeve 320 is positioned within outer sleeve 310, e.g., within inner volume 312 of outer sleeve 310. For example, inner sleeve 320 may be positioned on outer sleeve 310 within inner volume 312 of outer sleeve 310. Thus, inner sleeve 320 may be nested within outer sleeve 310, e.g., such that an outer surface inner sleeve 320 may correspond or match an inner surface of outer sleeve 310. In particular, an outer diameter of inner sleeve 320 may substantially (e.g., within ten percent) match an inner diameter of outer sleeve 310. Inner sleeve 320 is also pivotable or rotatable between a first position (FIG. 6) and a second position (FIG. 5) within outer sleeve 310. Inner sleeve 320 may pivot or rotate any suitable amount within outer sleeve 310 between the first and second positions. For example, inner sleeve 320 may pivot or rotate by less than thirty degrees within outer sleeve 310 between the first and second positions. It should be understood that inner sleeve 320 may also be pivoted or rotated to any suitable position between the first and second positions.

Inner sleeve 320 defines a plurality of radial openings 324. Radial openings 324 of inner sleeve 320 extend through inner sleeve 320, e.g., along the radial direction R. Thus, radial openings 324 of inner sleeve 320 provide access or passage through inner sleeve 320 within inner volume 312 of outer sleeve 310. Inner sleeve 320 also has a flow plate 326. Flow plate 326 of inner sleeve 320 is positioned within inner volume 312 of outer sleeve 310. Flow plate 326 of inner sleeve 320 defines a plurality of axial openings 328. Axial openings 328 of inner sleeve 320 extend through flow plate 326 of inner sleeve 320, e.g., along the axial direction A. Thus, axial openings 328 of inner sleeve 320 provide access or passage through flow plate 326 of inner sleeve 320 within inner volume 312 of outer sleeve 310.

Outer sleeve 310 may include any suitable number of radial openings 314 and axial openings 318. Similarly, inner sleeve 320 may include any suitable number of radial openings 324 and axial openings 328. In certain exemplary embodiments, a number of radial openings 314 of outer sleeve 310 may be equal to a number of radial openings 324 of inner sleeve 320. Thus, as an example, radial openings 314 of outer sleeve 310 and radial openings 324 of inner sleeve 320 may each includes at least six openings. In certain exemplary embodiments, a number of axial openings 318 of outer sleeve 310 may be equal to a number of axial openings 328 of inner sleeve 320. Thus, as an example, axial openings 318 of outer sleeve 310 and axial openings 328 of inner sleeve 320 may each includes at least six openings.

Damper valve 300 also includes a handle 330. Handle 330 is mounted to inner sleeve 320, e.g., flow plate 326 of inner sleeve 320. Handle 330 extends through outer sleeve 310 such that a distal end 332 of handle 330 is spaced apart from outer sleeve 310. In particular, outer sleeve 310 defines a slot 334. Handle 330 is disposed within slot 334 such that handle 330 extends through outer sleeve 310 at slot 334. Slot 334 extends between a first end portion 336 and a second end portion 338. Handle 330 is movable within slot 334 between the first and second end portions 336, 338 of slot 334. As may be seen in FIG. 5, handle 330 is positioned at first end portion 336 of slot 334 when inner sleeve 320 is in the first position. Conversely, handle 330 is positioned at second end portion 338 of slot 334 when inner sleeve 320 is in the second position. A user may grasp and move handle 330 in order to adjust inner sleeve 320 between the first and second positions within outer sleeve 310.

Turning now to FIG. 5, radial openings 324 of inner sleeve 320 are aligned with radial openings 314 of outer sleeve 310 when inner sleeve 320 is in the first position. In particular, each radial opening of radial openings 324 of inner sleeve 320 is aligned with a respective one of radial openings 314 of outer sleeve 310 when inner sleeve 320 is in the first position. Conversely, axial openings 328 of inner sleeve 320 are not aligned with axial openings 318 of outer sleeve 310 when inner sleeve 320 is in the first position. Thus, flow plate 316 of outer sleeve 310 and flow plate 326 of inner sleeve 320 are positioned such that the flow of air W exits inner volume 312 of outer sleeve 310 through radial openings 324 of inner sleeve 320 and radial openings 314 of outer sleeve 310 when inner sleeve 320 is in the first position. In such a manner, flow plate 316 of outer sleeve 310 and flow plate 326 of inner sleeve 320 may block the flow of air W to or from water heater appliance 100 when inner sleeve 320 is in the first position.

Turning now to FIG. 4, axial openings 328 of inner sleeve 320 are aligned with axial openings 318 of outer sleeve 310 when inner sleeve 320 is in the second position. In particular, each axial opening of axial openings 328 of inner sleeve 320 is aligned with a respective one of axial openings 318 of outer sleeve 310 when inner sleeve 320 is in the second position. Conversely, radial openings 324 of inner sleeve 320 are not aligned with radial openings 314 of outer sleeve 310 when inner sleeve 320 is in the second position. Thus, flow plate 316 of outer sleeve 310 and flow plate 326 of inner sleeve 320 are positioned such that the flow of air W passes through flow plate 316 of outer sleeve 310 and flow plate 326 of inner sleeve 320 when inner sleeve 320 is in the second position. In addition, inner sleeve 320 blocks radial openings 314 of outer sleeve 310 when inner sleeve 320 is in the second position. In such a manner, flow plate 316 of outer sleeve 310 and flow plate 326 of inner sleeve 320 may permit the flow of air W through inner volume 312 of outer sleeve 310 and inner sleeve 320 may block radial openings 314 of outer sleeve 310 when inner sleeve 320 is in the second position. It should be understood that inner sleeve 320 may also be pivoted or rotated to any suitable position between the first and second positions in order to only partially block the flow of air W through outer sleeve 310.

Outer sleeve 310 and inner sleeve 320 may be constructed of or with any suitable material. For example, outer sleeve 310 and inner sleeve 320 may be constructed of or with plastic or metal. In certain exemplary embodiments, outer sleeve 310 and inner sleeve 320 may each be constructed of or within a single, continuous piece of injection molded plastic or machined metal.

Figure 7:
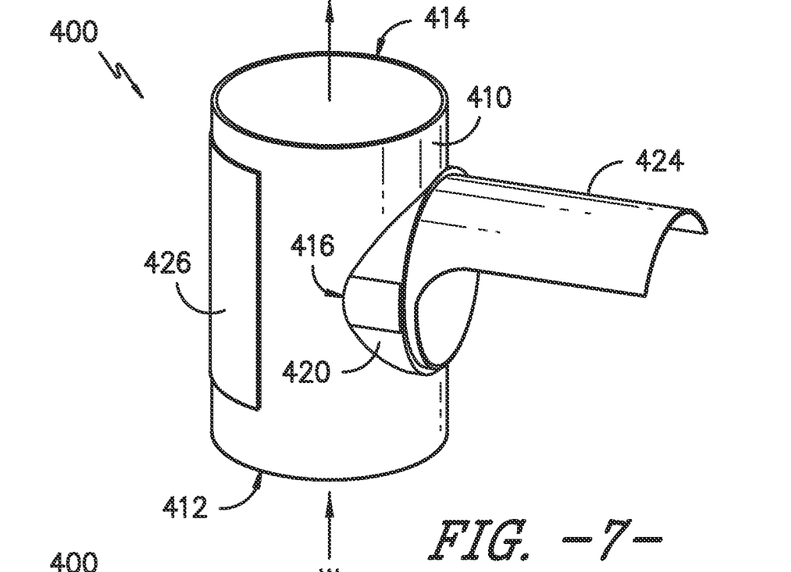
FIGS. 7 and 8 provide perspective views of a damper valve according to another exemplary embodiment of the present subject matter with a stopper of the exemplary damper valve shown in various positions.
Figure 8:
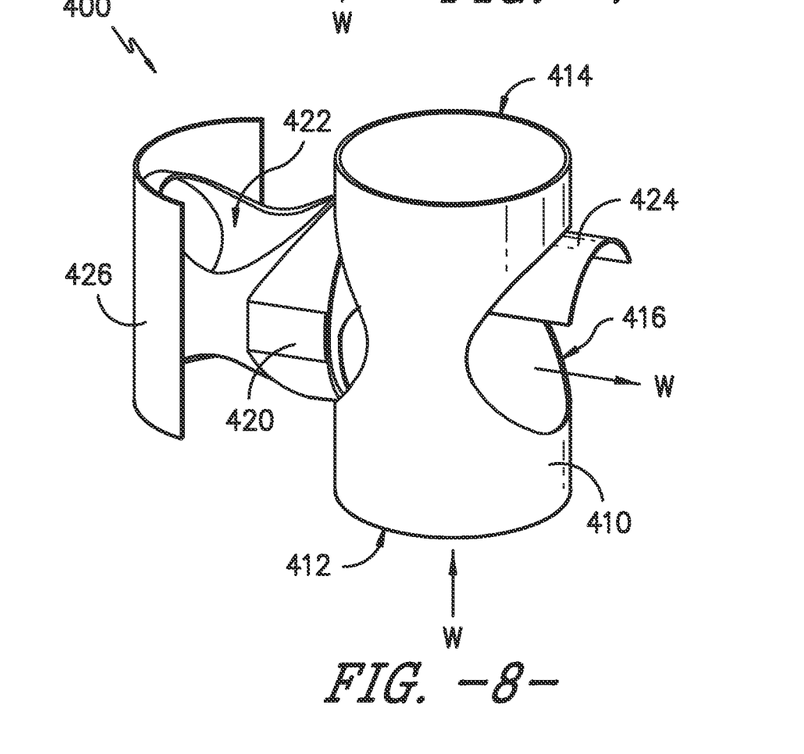

FIGS. 7 and 8 provide perspective views of a damper valve 400 according to another exemplary embodiment of the present subject matter. In FIGS. 7 and 8, a stopper 420 of damper valve 400 is shown in various positions. Damper valve 400 may be used for any suitable purpose. For example, damper valve 400 may be used in ventilation kit 200 as one of damper valves 230 (FIG. 3). As discussed in greater detail below, damper valve 400 includes features for regulating the flow of air W through damper valve 400.

As may be seen in FIGS. 7 and 8, damper valve 400 includes a casing 410 and a stopper 420. Casing 410 defines an entrance 412, a first exit 414 and a second exit 416. Entrance 412 is configured for receiving the flow of air W and directing the flow of air W into casing 410. Within casing 410, the flow of air W is directed to first exit 414 or second exit 416 depending upon the position of stopper 420, as discussed in greater detail below.

Stopper 420 defines a through hole 422 and includes a shield 424 and a plate 426 that is positioned on casing 410 when stopper 420 is in the first position. Stopper 420 is slidably or movably mounted to casing 410. In particular, stopper 420 is selectively movable between a first position (FIG. 7) and a second position (FIG. 8). As shown in FIG. 7, though hole 422 of stopper 420 is positioned within casing 410 and shield 424 of stopper 420 is positioned outside of casing 410 when stopper 420 is in the first position. Conversely, shield 424 of stopper 420 is positioned within casing 410 and though hole 422 of stopper 420 is positioned outside of casing 410 when stopper 420 is in the second position, as shown in FIG. 8.

When through hole 422 is positioned within casing 410, through hole 422 provides fluid communication between entrance 412 of casing 410 and first exit 414. Conversely, shield blocks first exit 414 and provides fluid communication between entrance 412 of casing 410 and second exit 416 when shield 424 is positioned within casing 410. Thus, by sliding stopper 420 between the first and second positions, a user may selectively direct the flow of air W to either first exit 414 or second exit 416 of casing 410.

Figure 9:
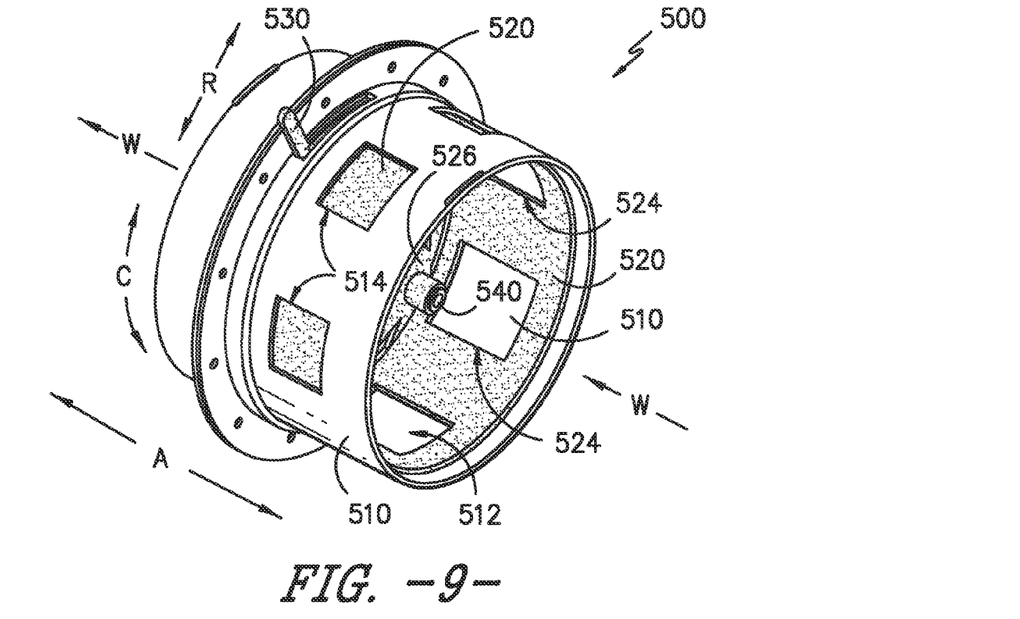
FIGS. 9 and 11 provide perspective views of a damper valve according to an additional exemplary embodiment of the present subject matter with an inner sleeve of the exemplary damper valve shown in various positions.
Figure 10:
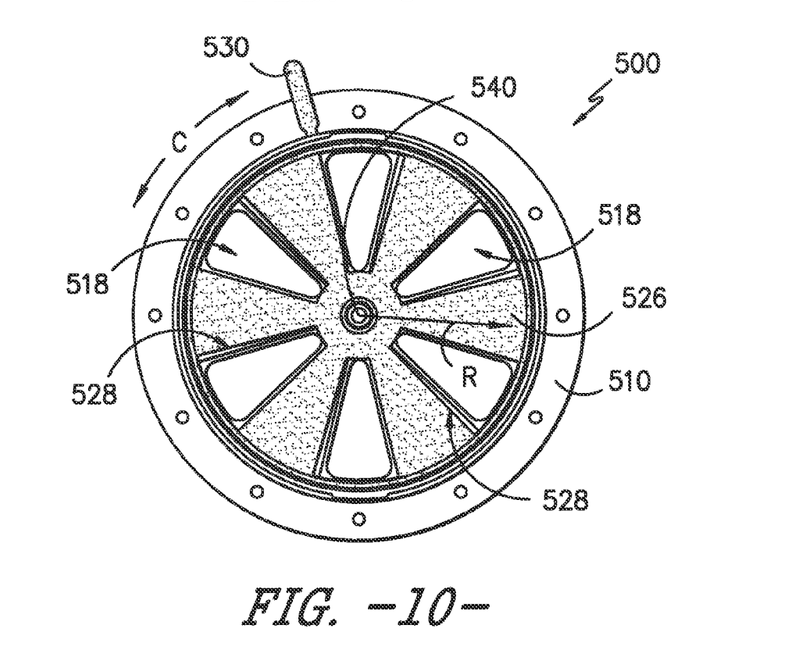
FIGS. 10 and 12 provide top, plan views of the exemplary damper valve of FIGS. 9 and 11, respectively.
Figure 11:
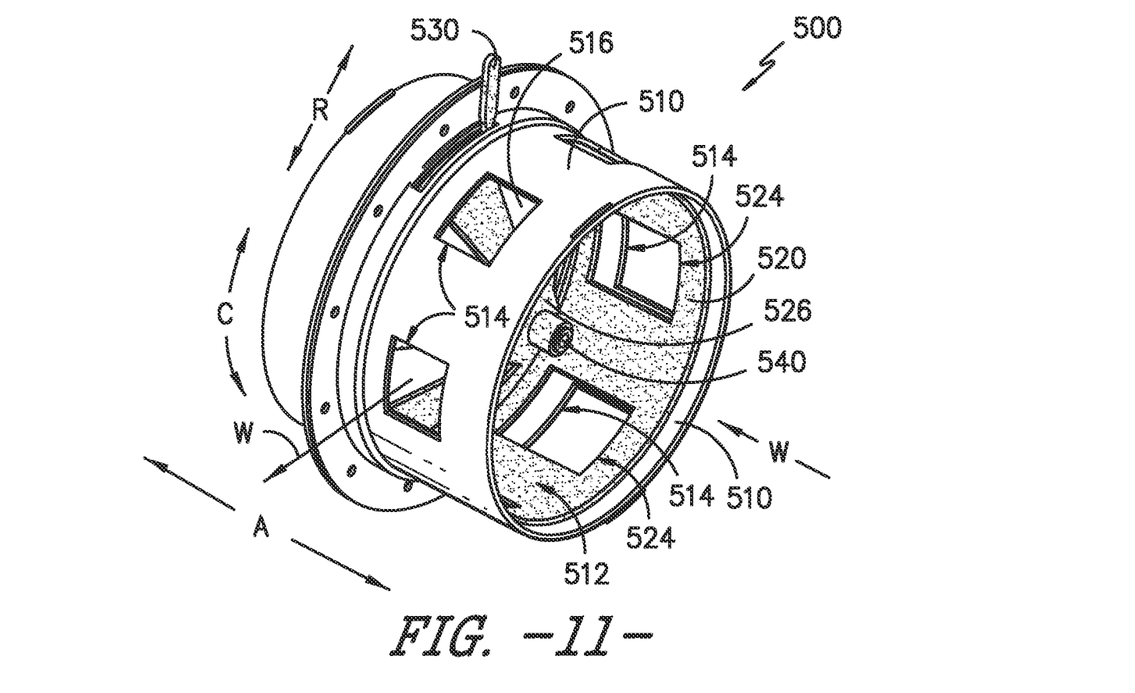
Figure 12:
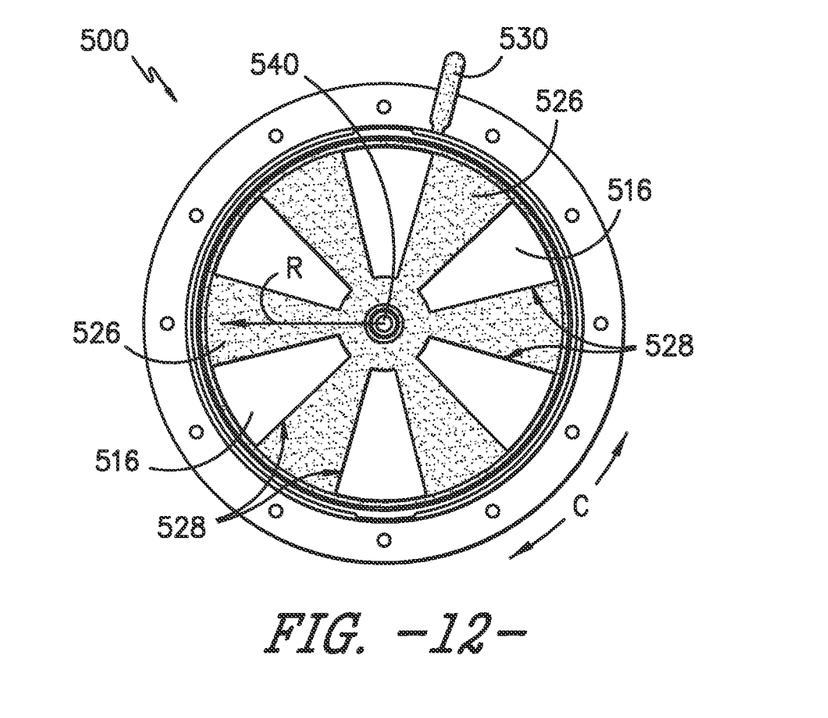

FIGS. 9 and 11 provide perspective views of a damper valve 500 according to an additional exemplary embodiment of the present subject matter. In FIGS. 9 and 11, an inner sleeve 520 of damper valve 500 is shown in various positions. FIGS. 10 and 12 provide top, plan views of damper valve 500. Damper valve 500 may be used for any suitable purpose. For example, damper valve 500 may be used in ventilation kit 200 as one of damper valves 230 (FIG. 3). As discussed in greater detail below, damper valve 500 includes features for regulating a flow of air W through damper valve 500. As may be seen in FIGS. 9 and 11, damper valve 500 defines an axial direction A, a radial direction R and a circumferential direction C. Damper valve 500 may be constructed in a similar manner to damper valve 300 (FIG. 4). Thus, damper valve 500 may include similar components and function in a similar manner as damper valve 300.

Damper valve 500 includes an outer sleeve 510 and an inner sleeve 520. As may be seen in FIGS. 9 and 11, outer sleeve 510 defines an inner volume 512. Inner volume 512 of outer sleeve 510 is configured for receiving the flow of air W and directing the flow of air W through outer sleeve 510.

Outer sleeve 510 also defines a plurality of radial openings 514, e.g., that are spaced apart from each other or distributed along the circumferential direction C. Radial openings 514 of outer sleeve 510 extend though outer sleeve 510, e.g., along the radial direction R, to inner volume 512 of outer sleeve 510. Thus, radial openings 514 of outer sleeve 510 provide access or passage into or out of inner volume 512 of outer sleeve 510 through outer sleeve 510. Outer sleeve 510 also has a flow plate 516. Flow plate 516 of outer sleeve 510 is positioned within inner volume 512 of outer sleeve 510. Flow plate 516 of outer sleeve 510 defines a plurality of axial openings 518. Axial openings 518 of outer sleeve 510 extend through flow plate 516 of outer sleeve 510, e.g., along the axial direction A.

Inner sleeve 520 is positioned within outer sleeve 510, e.g., within inner volume 512 of outer sleeve 510 Inner sleeve 520 is also pivotable or rotatable between a first position (FIG. 11) and a second position (FIG. 9) within outer sleeve 510. Inner sleeve 520 may pivot or rotate any suitable amount within outer sleeve 510 between the first and second positions. For example, inner sleeve 520 may pivot or rotate by less than thirty degrees within outer sleeve 510 between the first and second positions. It should be understood that inner sleeve 520 may also be pivoted or rotated to any suitable position between the first and second positions.

Inner sleeve 520 defines a plurality of radial openings 524. Radial openings 524 of inner sleeve 520 extend through inner sleeve 520, e.g., along the radial direction R. Inner sleeve 520 also has a flow plate 526. Flow plate 526 of inner sleeve 520 is positioned within inner volume 512 of outer sleeve 510. Flow plate 526 of inner sleeve 520 defines a plurality of axial openings 528. Axial openings 528 of inner sleeve 520 extend through flow plate 526 of inner sleeve 520, e.g., along the axial direction A.

Damper valve 500 also includes a handle 530 and a pivot pin 540. Pivot pin 540 extends through flow plate 516 of outer sleeve 510 and flow plate 526 of inner sleeve 520. Pivot pin 540 may couple inner sleeve 520 and outer sleeve 510 together, e.g., such that inner sleeve 520 is rotatable on pivot pin 540 within outer sleeve 510.

Figure 13:
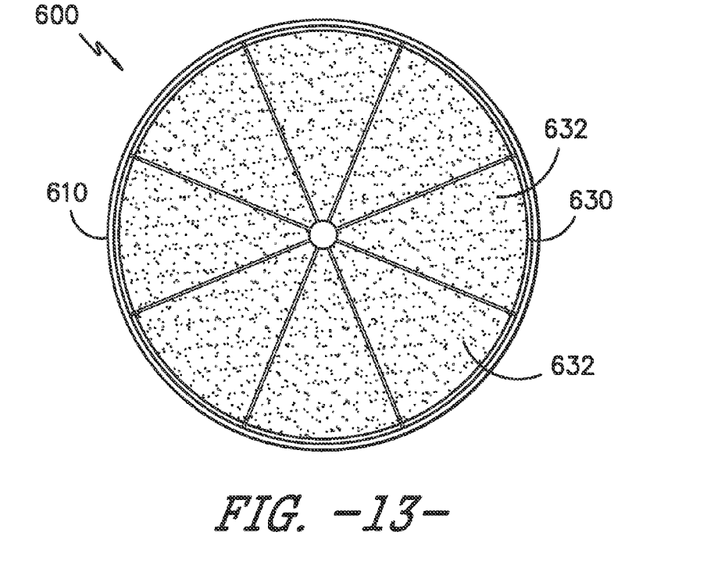
FIGS. 13 and 15 provide side elevation views of a damper valve according to another additional exemplary embodiment of the present subject matter with a skirt of the exemplary damper valve shown in various positions.
Figure 14:
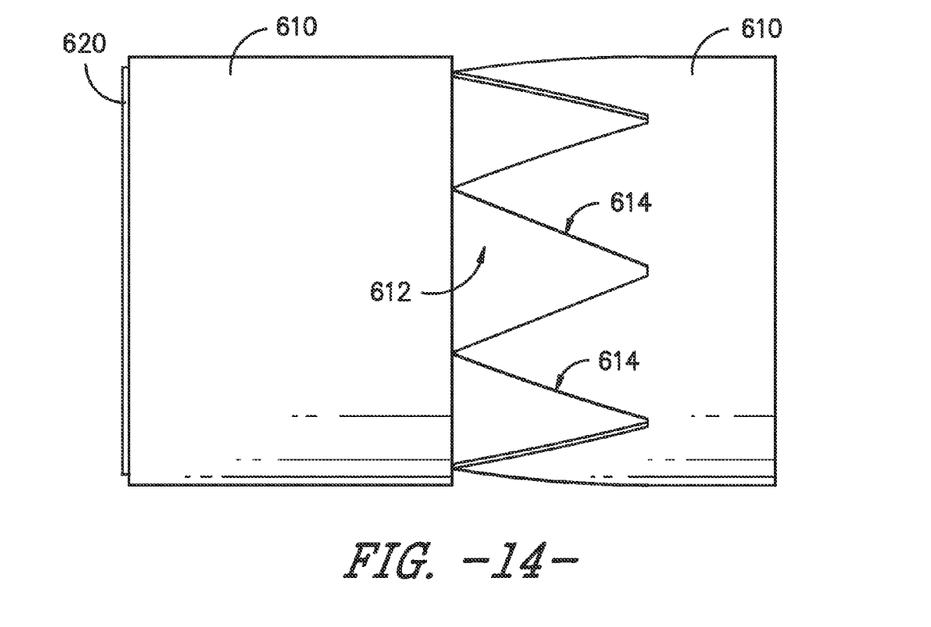
FIGS. 14 and 16 provide side elevation views of the exemplary damper valve of FIGS. 13 and 15, respectively.
Figure 15:
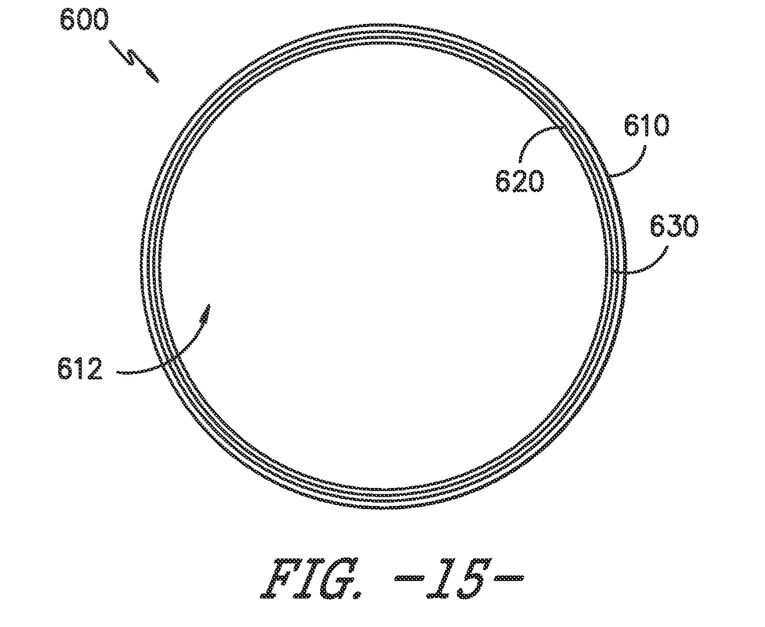
Figure 16:
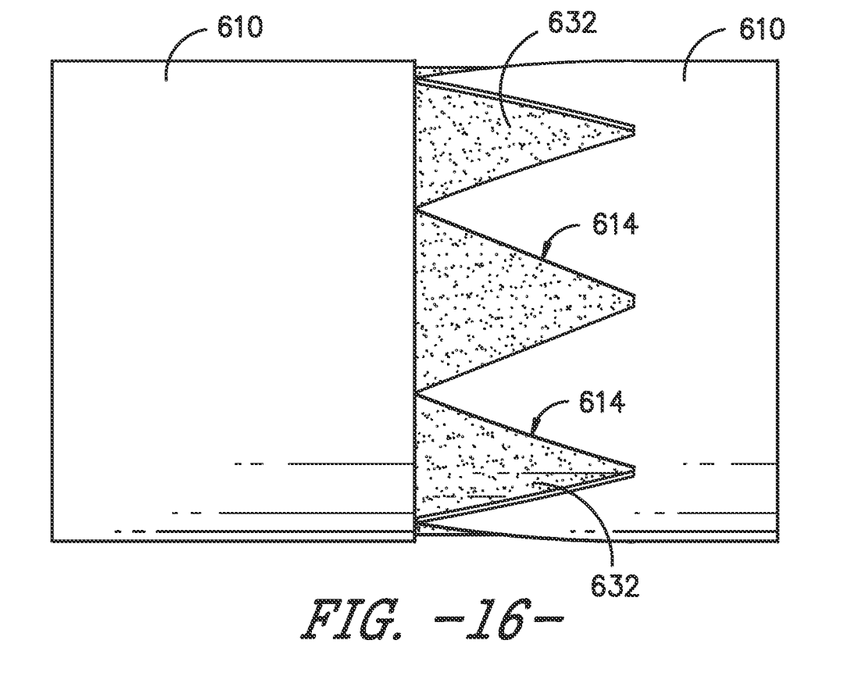

FIGS. 13 and 15 provide side elevation views of a damper valve 600 according to another additional exemplary embodiment of the present subject matter with a skirt of damper valve 600 shown in various positions. FIGS. 14 and 16 also provide side elevation views of damper valve 600. Damper valve 600 may be used for any suitable purpose. For example, damper valve 600 may be used in ventilation kit 200 as one of damper valves 230 (FIG. 3). As discussed in greater detail below, damper valve 600 includes features for regulating a flow of air through damper valve 600.

Damper valve 600 includes an outer sleeve 610 and an inner sleeve 620. As may be seen in FIGS. 13 and 14, outer sleeve 610 defines an inner volume 612. Inner volume 612 of outer sleeve 610 is configured for receiving the flow of air and directing the flow of air through outer sleeve 610.

Outer sleeve 610 also defines a plurality of radial openings 614, e.g., that are spaced apart from each other or distributed along a circumferential direction. Radial openings 614 of outer sleeve 610 extend though outer sleeve 610 to inner volume 612 of outer sleeve 610. Thus, radial openings 614 of outer sleeve 610 provide access or passage into or out of inner volume 612 of outer sleeve 610 through outer sleeve 610. Inner sleeve 620 is positioned within outer sleeve 610, e.g., within inner volume 612 of outer sleeve 610. Inner sleeve 620 is also moveable or slidable between a first position (FIG. 14) and a second position (FIG. 16) within outer sleeve 610.

Damper valve 600 further includes a seal or skirt 630. Skirt 630 is positioned within outer sleeve 610, e.g., within inner volume 612 of outer sleeve 610. In particular, at least a portion of skirt 630 may be positioned between outer sleeve 610 and inner sleeve 620 within inner volume 612 of outer sleeve 610. Skirt 630 includes a plurality of projections or flaps 632. Flaps 632 may assist with regulating the flow of air through damper valve 600. In particular, flaps 632 move or shift when inner sleeve 620 moves between the first position (FIG. 14) and the second position (FIG. 16) within outer sleeve 610. As may be seen in FIG. 13, flaps 632 extend radially inwardly towards a center of inner volume 612 of outer sleeve 610 when inner sleeve 620 is in the first position. Thus, flaps 632 block or limit the flow of air through damper valve 600 when inner sleeve 620 is in the first position. Turning to FIG. 14, the flow of air may exit inner volume 612 of outer sleeve 610 via radial openings 614 of outer sleeve 610 when inner sleeve 620 is in the first position. Conversely, as may be seen in FIG. 16, flaps 632 block or cover radial openings 614 of outer sleeve 610 when inner sleeve 620 is in the second position. Thus, the flow of air may flow through inner volume 612 of outer sleeve 610 without or with limited interference from flaps 632 when inner sleeve 620 is in the second position as shown in FIG. 15. Inner sleeve 620 elastically deforms skirt 630 when inner sleeve 620 moves between the first and second positions in order to move or adjust flaps 632.

As discussed above, damper valve 300 (FIG. 4), damper valve 400 (FIG. 7), damper valve 500 (FIG. 9) and damper valve 600 (FIG. 13) may be used with ventilation kit 200 of water heater appliance 100 (FIG. 3) as one of damper valves 230. Thus, means for regulating the flow of air F through intake duct 210 and/or exhaust duct 220 may include damper valves 300, 400, 500 and 600. Damper valves 300, 400, 500 and 600 may regulate the flow of air F through intake duct 210 and/or exhaust duct 220 by selectively adjusting between their respective open and closed positions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat pump water heater appliance, comprising:
   a casing;
   a tank positioned within the casing and defining an interior volume;
   a sealed system configured for heating water within the interior volume of the tank, the sealed system having an evaporator positioned within the casing;
   an intake duct extending from a remote location to the casing and configured for directing a flow of air towards the evaporator within the casing;
   an exhaust duct extending from the casing to the remote location and configured for directing the flow of air out of the casing;
   a first damper valve coupled to the intake duct and a second damper valve coupled to the exhaust duct, the first and second damper valves each comprising
      an outer sleeve defining an inner volume for receiving the flow of air, the outer sleeve defining a plurality of radial openings, the outer sleeve having a flow plate positioned within the inner volume of the outer sleeve, the flow plate of the outer sleeve defining a plurality of axial openings; and
      an inner sleeve pivotally mounted within the outer sleeve, the inner sleeve pivotable between a first position and a second position, the inner sleeve defining a plurality of radial openings, the plurality of radial openings of the inner sleeve aligned with the plurality of radial openings of the outer sleeve when the inner sleeve is in the first position, the inner sleeve having a flow plate positioned within the inner volume of the outer sleeve, the flow plate of the inner sleeve defining a plurality of axial openings, the plurality of axial openings of the inner sleeve aligned with the plurality of axial openings of the outer sleeve when the inner sleeve is in the second position;
   wherein the plurality of axial openings of the inner sleeve of the first damper valve are not aligned with the plurality of axial openings of the outer sleeve of the first damper valve when the inner sleeve is in the first position such that the flow plate of the outer sleeve of the first damper valve and the flow plate of the inner sleeve of the first damper valve block the flow of air to the water heater appliance from the remote location when the inner sleeve of the first damper valve is in the first position, whereby ambient air about the water heater appliance is directed towards the evaporator within the casing via the intake duct when the inner sleeve of the first damper valve is in the first position; and wherein the plurality of axial openings of the inner sleeve of the second damper valve are not aligned with the plurality of axial openings of the outer sleeve of the second damper valve when the inner sleeve of the second damper valve is in the first position such that the flow plate of the outer sleeve of the second damper valve and the flow plate of the inner sleeve of the second damper valve block the flow of air from the water heater appliance to the remote location when the inner sleeve of the second damper valve is in the first position, whereby the flow of air from the water heater appliance is directed into the ambient air about the water heater appliance via the exhaust duct when the inner sleeve of the second damper valve is in the first position.

2. The heat pump water heater appliance of claim 1, wherein the plurality of radial openings of the inner sleeve of each damper valve are unaligned with the plurality of radial openings of the outer sleeve of the respective damper valve when the inner sleeve of the respective damper valve is in the second position.

3. The heat pump water heater appliance of claim 1, wherein the flow plate of the outer sleeve of each damper valve and the flow plate of the inner sleeve of the respective damper valve are positioned such that the flow of air passes through the flow plate of the outer sleeve of each damper valve and the flow plate of the inner sleeve of the respective damper valve when the inner sleeve of the respective valve is in the second position.

4. The heat pump water heater appliance of claim 1, wherein the flow plate of the outer sleeve of the second damper valve and the flow plate of the inner sleeve of the second damper valve are positioned such that the flow of air exits the inner volume of the outer sleeve of the second damper valve through the plurality of radial openings of the inner sleeve of the second damper valve and the plurality of radial openings of the outer sleeve of the second damper valve when the inner sleeve of the second damper valve is in the first position.

5. The heat pump water heater appliance of claim 1, wherein each damper valve further comprises a handle mounted to the inner sleeve of the respective damper valve and extending though the outer sleeve of the respective damper valve such that a distal end of each handle is spaced apart from the outer sleeve of the respective damper valve.

6. A heat pump water heater appliance, comprising:
a casing;
a tank positioned within the casing and defining an interior volume;
a sealed system configured for heating water within the interior volume of the tank, the sealed system having an evaporator positioned within the casing;
an intake duct extending to the casing and configured for directing a flow of air towards the evaporator within the casing;
an exhaust duct extending from the casing and configured for directing the flow of air out of the casing;
a first means for regulating the flow of air in operative communication with the intake duct, and a second means for regulating the flow of air in operative communication with the exhaust duct;
wherein the first means for regulating the flow of air is configured to selectively block the flow of air to the water heater appliance from a remote location whereby ambient air about the water heater appliance is directed towards the evaporator within the casing; and
wherein the second means for regulating the flow of air is configured to selectively block the flow of air from the water heater appliance to the remote location whereby the flow of air from the water heater appliance is directed into the ambient air about the water heater appliance via the exhaust duct.

* * * * *

UNITED STATES PATENT AND TRADEMARK OFFICE
CERTIFICATE OF CORRECTION

PATENT NO. : 9,739,392 B2  
APPLICATION NO. : 14/508238  
DATED : August 22, 2017  
INVENTOR(S) : Timothy Scott Shaffer Page 1 of 1

It is certified that error appears in the above-identified patent and that said Letters Patent is hereby corrected as shown below:

In the Claims

In Line 40 of Column 13, the phrase "respective valve" should read "respective damper valve"

Signed and Sealed this  
Fifteenth Day of May, 2018

Andrei Iancu  
*Director of the United States Patent and Trademark Office*